US012782879B2

(12) United States Patent
Heusler

(10) Patent No.: US 12,782,879 B2
(45) Date of Patent: Nov. 3, 2026

(54) PRESS FOR DRIVING IN A BEZEL OR CRYSTAL OF A WATCH

(71) Applicant: Omega SA, Biel/Bienne (CH)

(72) Inventor: Christophe Heusler, Evilard (CH)

(73) Assignee: Omega SA, Biel/Bienne (CH)

( * ) Notice: Subject to any disclaimer, the term of this patent is extended or adjusted under 35 U.S.C. 154(b) by 476 days.

(21) Appl. No.: 18/481,348

(22) Filed: Oct. 5, 2023

(65) Prior Publication Data

US 2024/0126213 A1 Apr. 18, 2024

(30) Foreign Application Priority Data

Oct. 12, 2022 (EP) .................................... 22201030

(51) Int. Cl.
*G04D 3/04* (2006.01)

(52) U.S. Cl.
CPC ...................................... *G04D 3/04* (2013.01)

(58) Field of Classification Search
CPC .......... G04D 1/00; G04D 1/0021; G04D 3/00; G04D 3/04; G04D 3/06; B23P 19/00; B23P 19/02
See application file for complete search history.

(56) References Cited

U.S. PATENT DOCUMENTS 1,767,935 A 6/1930 Mcdaniel
4,210,798 A 7/1980 Ode et al.
6,257,813 B1 7/2001 Tanimura
2021/0165371 A1* 6/2021 Hauser ................. G04D 3/0209
2021/0302915 A1* 9/2021 Cretenet ................ G04D 7/004

FOREIGN PATENT DOCUMENTS

CH 177654 A 6/1935
CH 717 273 A2 9/2021
CN 102371699 A 3/2012
CN 208713324 U 4/2019
CN 212723672 U 3/2021
CN 112882372 A 6/2021
CN 113766987 A 12/2021
CN 114603344 A 6/2022
(Continued)

OTHER PUBLICATIONS

European Search Report issued Mar. 17, 2023 in European Application 22201030.8 filed on Oct. 12, 2022 citing documents 1-3, 15-17 therein, 3 pages (with English Translation of Categories of Cited Documents).
(Continued)

*Primary Examiner* — C. A. Rivera
(74) *Attorney, Agent, or Firm* — Oblon, McClelland, Maier & Neustadt, L.L.P.

(57) ABSTRACT

A press for driving a crystal or a bezel into a watch case middle, including a support designed to hold the middle in position, and a bracket supporting a tool-holder to which a tool is attached, the tool-holder being movable in translation and cooperating with a handling member so as to slide relative to the bracket along an axis A-A when solicited by the handling member, the support including at least two jaws intended to cooperate with the middle so as to ensure that it is held in position, each jaw being movable in a plane P orthogonal to the axis A-A.

9 Claims, 3 Drawing Sheets

(56) References Cited

FOREIGN PATENT DOCUMENTS

| | | | | | |
|---|---|---|---|---|---|
| DE | 10 2014 112 845 | A1 | | 3/2016 | |
| FR | 1495452 | A | | 9/1967 | |
| GB | 1 532 788 | A | | 11/1978 | |
| JP | 63-259489 | A | | 10/1988 | |
| JP | S63259489 | A | * | 10/1988 | ............... H01S 5/50 |
| JP | 6-69888 | U | | 9/1994 | |
| JP | H0669888 | U | * | 9/1994 | |
| JP | 2021-101182 | A | | 7/2021 | |

OTHER PUBLICATIONS

Office Action issued Sep. 10, 2024, in corresponding Japanese Patent Application No. 2023-160697 (with English Translation), citing documents 15-17 therein, 10 pages.

Combined Chinese Office Action and Search Report issued Feb. 11, 2026, in corresponding Chinese Patent Application No. (with English Translation and English Translation of Category of Cited Documents) citing documents 1-10 therein, 8 pages.

* cited by examiner

PRESS FOR DRIVING IN A BEZEL OR CRYSTAL OF A WATCH

CROSS-REFERENCE TO RELATED APPLICATION

This application claims priority to European Patent Application No. 22201030.8 filed on Oct. 12, 2022, the entire disclosure of which is hereby incorporated herein by reference.

TECHNICAL SCOPE OF THE INVENTION

The invention belongs to the field of tooling in the microtechnology sector, in particular in the watchmaking sector, e.g. for after-sales service.

More particularly, the invention relates to a press for driving a watch bezel or crystal into a watch case middle.

TECHNOLOGICAL BACKGROUND

In order to carry out after-sales service operations on a watch, the watch crystal must sometimes be removed. For this purpose, tools have been developed for removing watch crystals, such as those mentioned in the prior art patent EP3835888.

Once the service operations have been carried out, the crystal, and if necessary the bezel, must be driven into the watch case middle. Presses for carrying out this operation are well known, and consist of a support for holding the middle in a predefined position opposite a bracket in which a tool-holder slides when a user actuates a control member. The tool-holder carries a tool designed to apply pressure against the crystal to drive it into the opening provided for this purpose in the middle.

Generally, the press support is removable, so that the user can have several supports of different dimensions to suit the different sizes of watch case middles on which the user may perform services. The user must therefore ensure that he/she has a sufficiently large number of different supports to be able to perform services on a wide variety of watches.

The aim of the present invention is to do away with the need for these different supports and, in particular, with the drawbacks associated with their storage and use.

SUMMARY OF THE INVENTION

The invention overcomes the aforementioned drawbacks by offering a solution enabling a crystal or bezel to be driven into a watch case middle, regardless of the dimensions of said middle, simply and quickly, using a press with a single support.

To this end, the present invention relates to a press for driving a crystal or a bezel into a watch case middle, comprising a support designed to hold the middle in position, a bracket supporting a tool-holder to which a tool is fixed, said tool-holder being movable in translation and cooperating with a handling member so as to slide relative to said bracket along an axis A-A upon actuation of said handling member.

The support includes at least two jaws designed to cooperate with the middle to hold it in position, each jaw being movable in a plane P orthogonal to the axis A-A. Thus, thanks to the features of the invention, the press can be used to drive bezels or crystals into middles of any size, without having to change the support.

In particular embodiments, the invention may further include one or more of the following features, taken alone or according to any combination technically possible.

In particular embodiments, the jaws are designed to bear against an internal surface of the middle and tend to move away from each other, i.e. from the axis A-A, when solicited by a resilient member with which the support is equipped, so as to apply clamping forces to said middle to hold it in position.

In particular embodiments, the support includes a connecting member kinematically connected to the jaws so that, when solicited, it displaces the jaws towards the axis A-A, against the forces exerted by the resilient member.

In particular embodiments, the support comprises a base with rectilinear grooves and the connecting member is in the form of a plate arranged so as to be rotatable relative to the base, about the axis A-A, and comprises helical grooves. The jaws are slidably engaged in the grooves of the base and plate, so that rotation of the plate about the axis A-A causes the jaws to translate in the plane P.

In particular embodiments, the rectilinear grooves have a T-shaped cross-section, the jaws each including a head via which they are intended to cooperate with the middle, said head being attached to a foot having a shape complementary to that of the rectilinear grooves so as to slide in one of said grooves.

In particular embodiments, the resilient member is torsionally stressed and is connected at a first end to the plate and at a second end to the base.

In particular embodiments, the plate includes a gripping member so that it can be rotated, when said gripping member is actuated by a user, against the force generated by the resilient member.

In particular embodiments, the jaws are evenly distributed around the axis A-A.

In particular embodiments, the support includes an angular positioning element connected to the base and adapted to cooperate with the middle to eliminate any degree of rotational freedom about the axis A-A thereof.

In particular embodiments, at least one of the jaws includes a graphic representation for guiding the orientation, relative to the middle, of the bezel or crystal to be driven in.

In particular embodiments, the support includes an adapter sole adapted to adjust the tension of the resilient member, receiving the second end of the resilient member by way of attachment and being rotatably attached to the base, said sole comprising a member for locking it against rotation with respect to the base.

BRIEF DESCRIPTION OF THE FIGURES

Further features and advantages of the invention will become apparent from the following detailed description, given by way of example and by no means restrictive, with reference to the accompanying drawings in which.

DETAILED DESCRIPTION OF THE INVENTION

Figure 1:
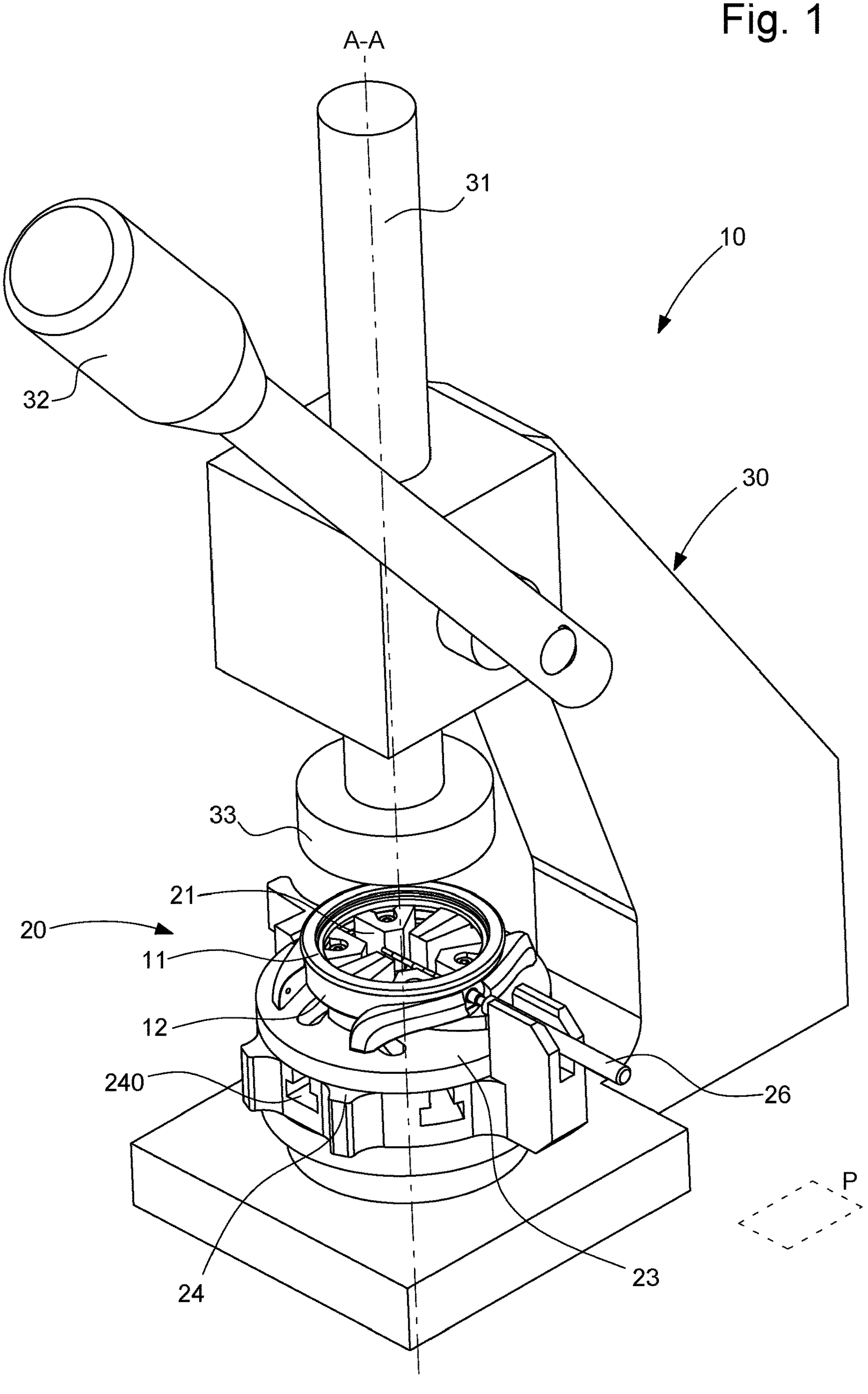
FIG. 1 shows a perspective view of a press according to a preferred embodiment of the invention, comprising a support holding a watch case middle in position, into which middle a bezel is driven.

FIG. 1 shows a press 10 for driving a crystal or bezel 11 into a watch case middle 12, comprising a support 20 designed to hold the middle 12 in position, i.e. without any degree of freedom, in order to receive said crystal or bezel 11 when driven therein.

The press 10 further includes, in order to carry out this driving-in operation, a bracket 30 supporting a tool-holder 31 capable of moving in translation and cooperating with a handling member 32, so as to slide relative to said bracket 30, for example within an opening in which it is engaged, along an axis A-A when said handling member 32 is actuated by a user. It goes without saying that the axis A-A is intended to correspond with the centre of the middle 12, as shown in the figures.

A tool 33, such as a press chuck known per se to a person skilled in the art, is attached to the tool-holder 31, for example by clamping, magnetisation, screwing or any other suitable means.

In particular, the handling member 32 can be formed by a lever which can be rotated, as illustrated in the example embodiment of the invention shown in FIG. 1. In particular, the tool-holder 31 can include a shaft which is notched along a portion of its length to form a rack (not visible in FIG. 1), the teeth of which cooperate with a toothed wheel with which the handling member 32 is equipped, said toothed wheel being attached to the lever.

Advantageously, the support 20 has adjustable radial dimensions, said dimensions being defined in a plane P orthogonal to the axis A-A. The term radial is used here to refer to the radial dimension of the middle 12 intended to be held in position by the support 20.

In this way, it can be adapted to the dimensions of any middle, eliminating the need for removable supports and easing the fitting operation.

More specifically, the support 20 includes at least two jaws 21, preferably at least three, evenly distributed around the axis A-A, and designed to cooperate with the middle 12 by clamping so as to hold it in position. Each jaw 21 is movable in the plane P, as described in detail below. In this example embodiment of the invention, the support 20 includes six jaws 21, diametrically opposite one another in pairs. This feature ensures optimum distribution of the forces applied to the case middle 12.

In the preferred embodiment of the invention, the jaws 21 tend to move away from each other, i.e. from the axis A-A, under the effect of a resilient member 22 arranged in the support 20, so as to be able to bear against an internal surface of the middle 12, in order to apply clamping forces to said middle 12. There is thus no risk of damaging the visible surfaces of the middle 12 while it is being held in position.

Moreover, the jaws 21 are advantageously designed to support the middle 12, and in particular a shoulder thereof, on an upper bearing face lying in a plane orthogonal to the axis A-A. This feature contributes to the stability of the middle 12 during the driving-in operation, insofar as the forces generated by the tool 33 during this operation are transmitted by the middle 12 to these upper bearing faces.

In order to displace the jaws 21, the support 20 comprises a connecting member kinematically connected to the jaws 21, so that when it is solicited against the forces exerted by the resilient member 22, it moves the jaws 21 towards the axis A-A, i.e. towards each other, as described below. The connecting member takes the form of a plate 23 in the preferred example embodiment of the invention shown in FIGS. 1 to 3.

Figure 3:
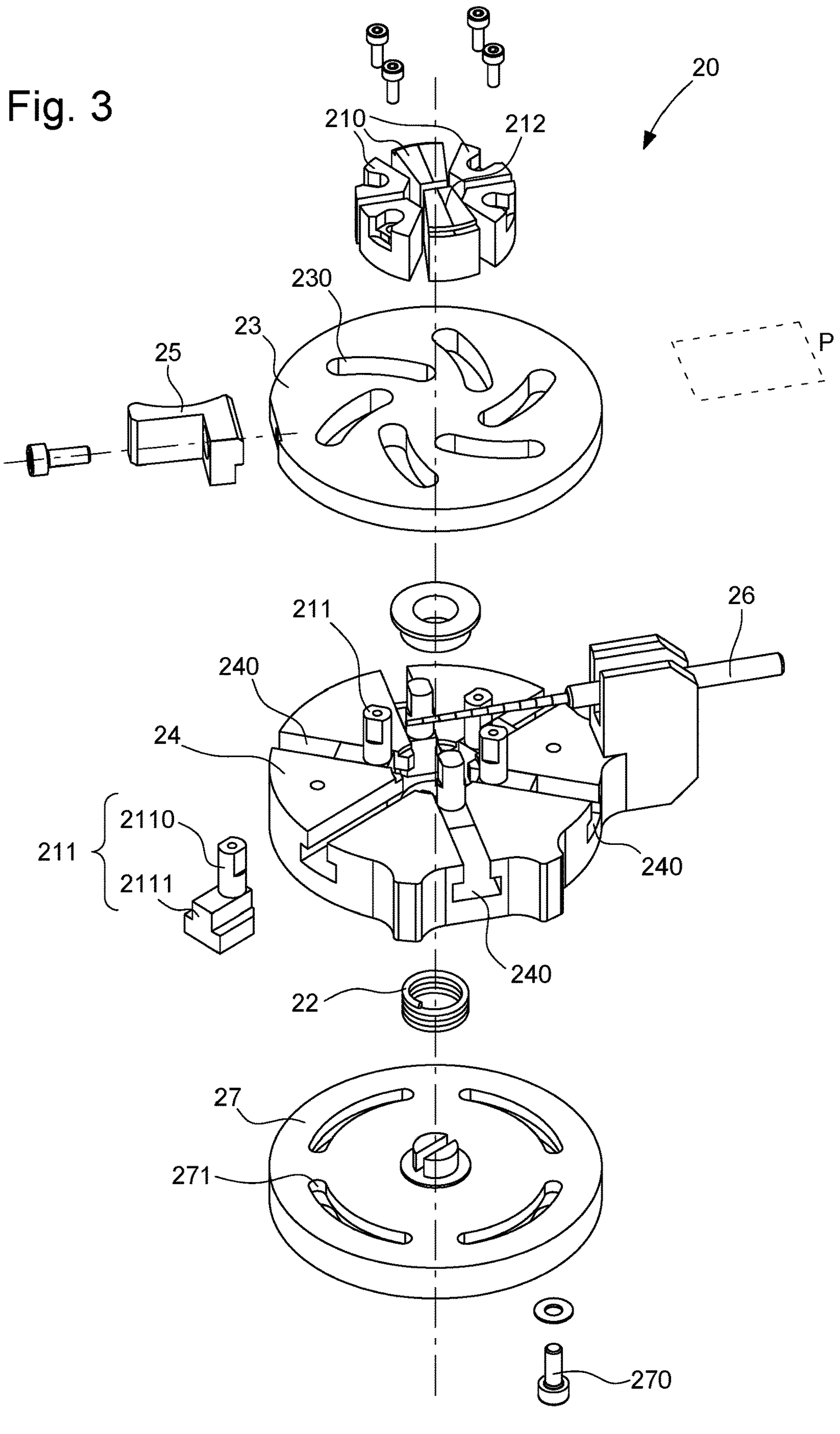
FIG. 3 shows an exploded view of the support shown in FIG. 2.

In the preferred example embodiment of the invention, as shown in the exploded view in FIG. 3, the support 20 comprises a base 24 which is stationary relative to the bracket 30. The plate 23 is rotatably mounted on the base 24 about the axis A-A, for example by means of a plain bearing, ball bearing or other suitable means.

The base 24 has rectilinear grooves 240 extending lengthwise in a plane orthogonal to the axis A-A, for example along longitudinal axes passing through the axis A-A, said rectilinear grooves 240 being evenly distributed around the axis A-A. The plate 23 comprises helical grooves 230 evenly distributed around the axis A-A, each of which partially faces a rectilinear groove 240, said helical grooves also extending lengthwise in a plane orthogonal to the axis A-A. The helical grooves 230 are preferably curvilinear.

As shown in the figures, the base 24 and the plate 23 respectively include a number of rectilinear grooves 240 and helical grooves 230 corresponding to the number of jaws 21, so that each jaw 21 is slidingly engaged in a rectilinear groove 240 and in a helical groove 230. Thus, rotation of the plate 23 about the axis A-A drives the jaws 21 in translation along axes orthogonal to the axis A-A, said jaws 21 moving away from each other or towards each other depending on the direction of rotation of said plate 23.

Equivalently, the base 24 could conceivably have helical grooves 230 and the plate 23 have rectilinear grooves 240.

Figure 2:
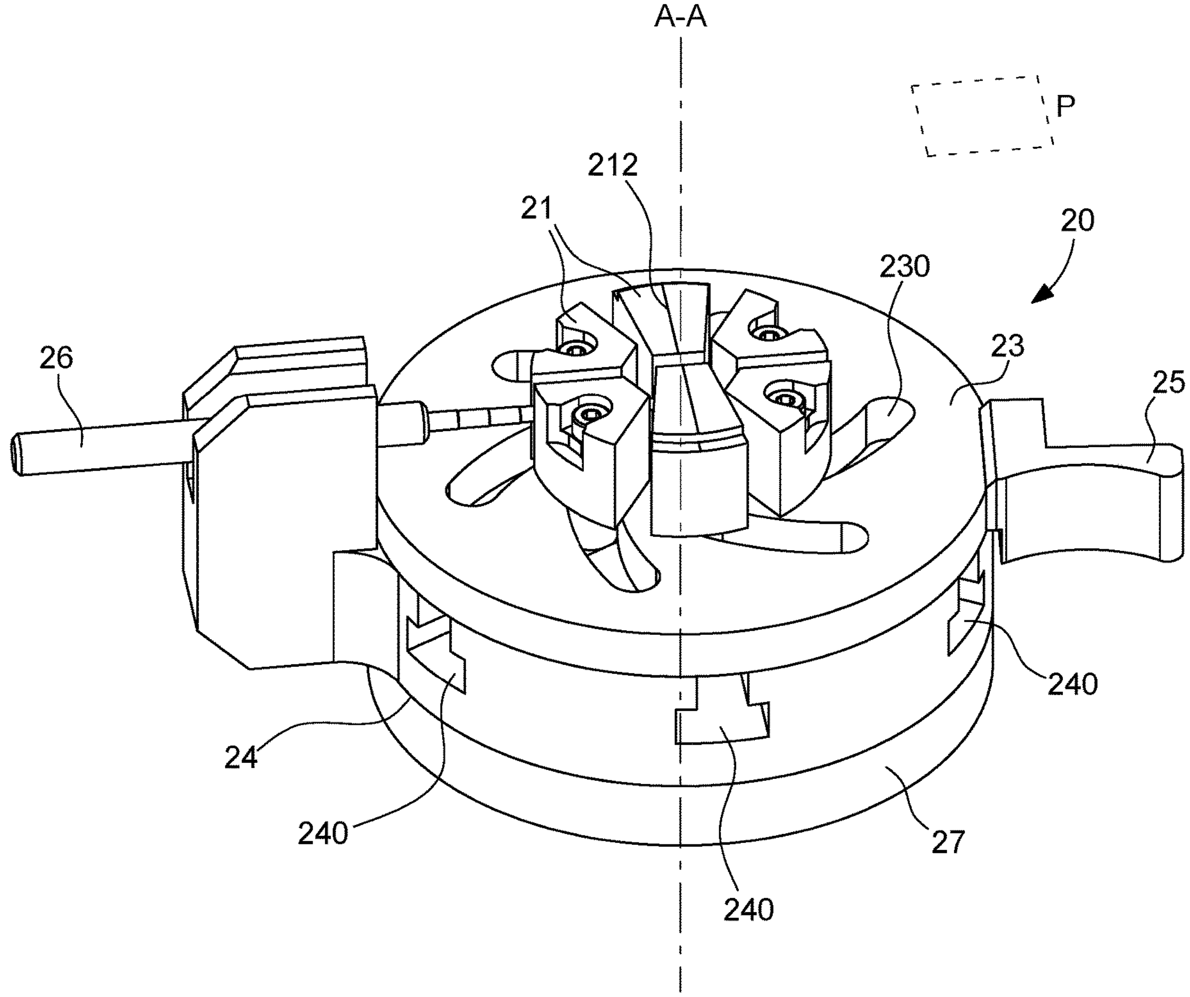
FIG. 2 shows a detailed view of the press support shown in FIG. 1.

As shown in FIGS. 1 to 3, in a preferred example embodiment of the invention, the rectilinear grooves 240 have a T-shaped cross-section extending from an opening that opens out opposite the plate 23 to a back.

Furthermore, in this preferred embodiment, the jaws 21 each include a head 210 resting against the plate 23 and by means of which they are intended to cooperate with the middle 12, each head 210 being attached to a foot 211. The feet 211 are each engaged, on the one hand, through a helical groove 230, via a first portion 2110, and on the other hand, in a rectilinear groove 240, via a second portion 2111, as seen in FIG. 3. The second portion 2111 of the feet 211 advantageously has a complementary shape to that of the rectilinear grooves 240, so as to be constrained to a single degree of translational freedom. Rotation of the plate 23 thus forces each helical groove 230, via one of its sidewalls, to apply thrust forces on the first portion 2110 of the foot 211 with which it cooperates, which causes the second portion 2111 of this foot 211 to translate, and thus each jaw 21 to slide.

The jaws 21 can be removable so that they can be replaced if necessary, thus simplifying maintenance operations on the press 10. In the example embodiment shown in the figures and visible in detail in the exploded view of FIG. 3, each head 210 is attached to a foot 211 by screwing a screw into a thread in the foot 211.

Preferably, the resilient member 22 is designed to be torsionally stressed and is connected, by a first end, to the plate 23, and by a second end, to the base 24, so as to rotate the plate 23 relative to the base 24. The resilient member 22 is, for example, a helical torsion spring.

In the example embodiment shown in FIGS. 1 to 3, the plate 23 advantageously includes a gripping member 25 so that it can be pivoted by a user against the force generated by the resilient member 22. The resilient member 22 can then be stressed to bring the jaws 21 closer together, for example until they reach an extreme abutment position, as close as possible to the axis A-A, as shown in FIG. 2, enabling a middle 12 to be engaged on these jaws 21, into which middle a crystal or bezel must be driven. The middle 12 is held in position when the user releases the gripping member 25. More specifically, the plate 23 then pivots under the action of the resilient member 22, causing the jaws 21 to move into contact with the middle 12 and thus apply clamping forces to said middle 12.

The gripping member 25 is shown in the form of a handle intended to be handled by a user in FIGS. 1 to 3. However, in other example embodiments of the invention, it may consist of an electric motor kinematically connected to the plate 23 and controlled by a control module.

The support 20 can include an angular positioning element 26, as shown in FIGS. 1 to 3, connected to the base 24 and adapted to cooperate with the middle 12 to eliminate any possible degree of rotational freedom of the middle about the axis A-A. This angular positioning element 26, in addition to further ensuring that the middle 12 is held in position, guarantees perfect positioning relative to the tool 33 when it is brought into position.

In FIGS. 1 to 3, such an angular positioning element 26 is formed by a shaft supported by an arm connected to the periphery of the base 24, which shaft is capable of moving in translation and intended to engage in an opening in the middle 12, for example in an opening intended to receive a crown shaft.

Advantageously, the support 20 can further include an adapter sole 27 for adjusting the tension of the resilient member 22 and, consequently, the intensity of the forces it is able to supply. This sole 27 rests under the base 24, to which it is removably attached, and receives the second end of the resilient member 22 by way of attachment.

The sole 27 is arranged with a degree of rotational mobility relative to said base 24, for example relative to the axis A-A, so that the tension of the resilient member 22 varies according to the angular position of the sole 27 relative to the base 24. The sole 27 further comprises a rotation-locking member, formed for example, as shown in FIG. 3, by a screw 270 designed to be engaged, on the one hand, through a groove 271 in the sole 27 extending along an arc of a circle, the centre of which coincides with the axis of rotation of the sole 27, and, on the other hand, in a thread made in a face of the base 24 opposite the rectilinear grooves 240. Thus, by screwing or unscrewing the screw, the relative rotation of the sole 27 and of the base 24 is free or not. Preferably, the sole 27 includes several screws 270 engaged in grooves 271 and threads in the base 24. Other rotation-locking members are also possible, such as pins, etc.

Advantageously, the present invention allows the orientation of the bezel 11 or crystal relative to the middle 12 to be controlled while being driven therein, for example when said bezel 11 is decorated or includes indexes or when said crystal includes a magnifying element. In particular, the head 210 of a jaw 21 may include a graphic representation 212, for example on the bearing face, for guiding the angular position of the bezel 11 or crystal to be driven into the middle 12. More specifically, the graphic representation 212 can be produced such that it provides a reference point with which the user must align the bezel or crystal.

The invention claimed is:

1. A press for driving a crystal or a bezel into a middle of a watch, comprising:

a support to hold the middle in position; and a bracket supporting a tool-holder to which a tool is attached, said tool-holder being movable in translation and cooperating with a handling member so as to slide relative to said bracket along an axis A-A upon actuation of said handling member, wherein the support includes at least two jaws designed to cooperate with the middle so as to hold the middle in position, wherein each jaw is movable in a plane P orthogonal to the axis A-A, wherein the jaws configured to bear against an internal surface of the middle and move away from one another when acted upon by a resilient member with which the support is equipped, so as to apply clamping forces to said middle, and wherein the support comprises a connecting member kinematically connected to the jaws, the connecting member configured to displace the jaws towards the axis A-A, against the forces exerted by the resilient member.

2. The press according to claim 1, wherein the support comprises a base with rectilinear grooves, the connecting member being in the form of a plate arranged so as to be rotatable relative to the base, about the axis A-A, and comprises helical grooves, the jaws being slidably engaged in the grooves of the base and of the plate so that rotation of the plate about the axis A-A causes the jaws to translate in the plane orthogonal to the axis A-A.

3. The press according to claim 2, wherein the rectilinear grooves have a T-shaped cross-section, the jaws each including a head via which they are intended to cooperate with the middle, said head being attached to a foot having a shape complementary to that of the rectilinear grooves so as to slide in one of said grooves.

4. The press according to claim 2, wherein the resilient member is torsionally stressed and is connected at a first end to the plate and at a second end to the base.

5. The press according to claim 4, wherein the plate comprises a gripping member so that the plate can be rotated, when said gripping member is actuated by a user, against the force generated by the resilient member.

6. The press according to claim 1, wherein the jaws are evenly distributed around the axis A-A.

7. The press according to claim 1, wherein the support comprises an angular positioning element connected to the base and adapted to cooperate with the middle to eliminate any degree of rotational freedom about the axis A-A thereof.

8. The press according to claim 7, wherein at least one of the jaws comprises a graphic representation for guiding the orientation, relative to the middle, of the bezel or crystal to be driven in.

9. The press according to claim 1, wherein the support comprises an adapter sole adapted to adjust the tension of the resilient member, receiving the second end of the resilient member by way of attachment and being rotatably attached to the base, said sole comprising a member for locking the sole against rotation with respect to the base.

* * * * *